United States Patent
Pontius

(10) Patent No.: US 8,259,755 B2
(45) Date of Patent: Sep. 4, 2012

(54) ALIGNMENT AND DESKEW FOR MULTIPLE LANES OF SERIAL INTERCONNECT

(75) Inventor: Tim Pontius, Crystal Lake, IL (US)

(73) Assignee: NXP B.V., Eindhoven (NL)

( * ) Notice: Subject to any disclaimer, the term of this patent is extended or adjusted under 35 U.S.C. 154(b) by 396 days.

(21) Appl. No.: 12/092,200

(22) PCT Filed: Nov. 2, 2006

(86) PCT No.: PCT/IB2006/054056
§ 371 (c)(1),
(2), (4) Date: Apr. 30, 2008

(87) PCT Pub. No.: WO2007/052229
PCT Pub. Date: May 10, 2007

(65) Prior Publication Data
US 2008/0279224 A1    Nov. 13, 2008

(51) Int. Cl.
*H04J 3/06* (2006.01)
(52) U.S. Cl. ........................................ 370/503
(58) Field of Classification Search .............. 713/401; 709/237; 375/219; 714/700; 370/503
See application file for complete search history.

(56) References Cited

U.S. PATENT DOCUMENTS

| | | | |
|---|---|---|---|
| 5,293,626 A * | 3/1994 | Priest et al. ............... | 713/401 |
| 6,031,847 A | 2/2000 | Collins et al. | |
| 6,167,077 A | 12/2000 | Ducaroir et al. | |
| 6,512,804 B1 | 1/2003 | Johnson et al. | |
| 7,007,099 B1 * | 2/2006 | Donati et al. .............. | 709/237 |
| 2002/0174390 A1 | 11/2002 | Craft | |
| 2002/0184552 A1 | 12/2002 | Evoy et al. | |
| 2002/0186717 A1 | 12/2002 | Haq | |
| 2003/0007549 A1 | 1/2003 | Kada et al. | |
| 2003/0065987 A1 | 4/2003 | Ehmann et al. | |
| 2003/0081713 A1 | 5/2003 | Pontius et al. | |
| 2004/0123190 A1 * | 6/2004 | Toyoda et al. ............. | 714/700 |
| 2007/0002939 A1 * | 1/2007 | Daugherty ................ | 375/219 |

FOREIGN PATENT DOCUMENTS

WO    2005/015864 A1    2/2005

OTHER PUBLICATIONS

Genusov, A. et al. "Verification of Skew and Jitter Tolerance and Compensation in High-Speed Interfaces", Zaiq Technologies White Paper (2005).

* cited by examiner

*Primary Examiner* — Anh-Vu Ly
*Assistant Examiner* — Gbemileke Onamuti

(57) ABSTRACT

Methods and apparatus are provided for data communication between a transmitter and receiver over a plurality of serial links, which cause the transmitter to send serialized groups of bits down each lane, in such a way that the first bit of each group (each lane) is guaranteed to arrive in the correct order at the receiving end. Various embodiments of the present invention include declaring a budget for the maximum skew between lanes. In such embodiments, subsequent to determining the skew budget between lanes, the data to be transmitted is divided into groups of N bits, where N is any convenient number larger than M times S, with M being the number of lanes and S being the budgeted skew, in bit times.

20 Claims, 2 Drawing Sheets

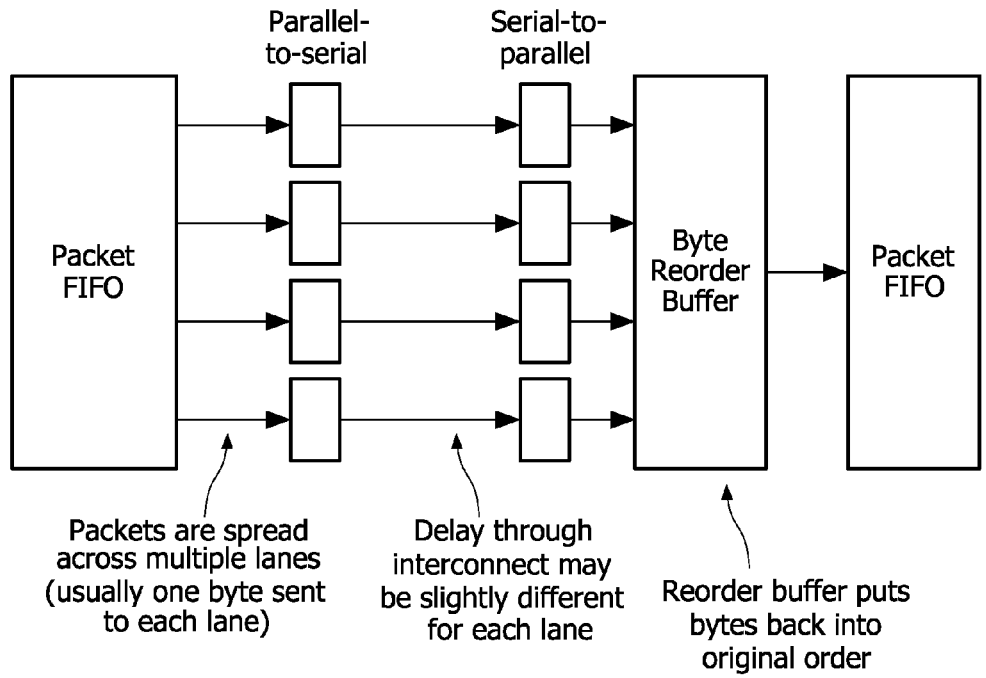
FIG. 1  PRIOR ART
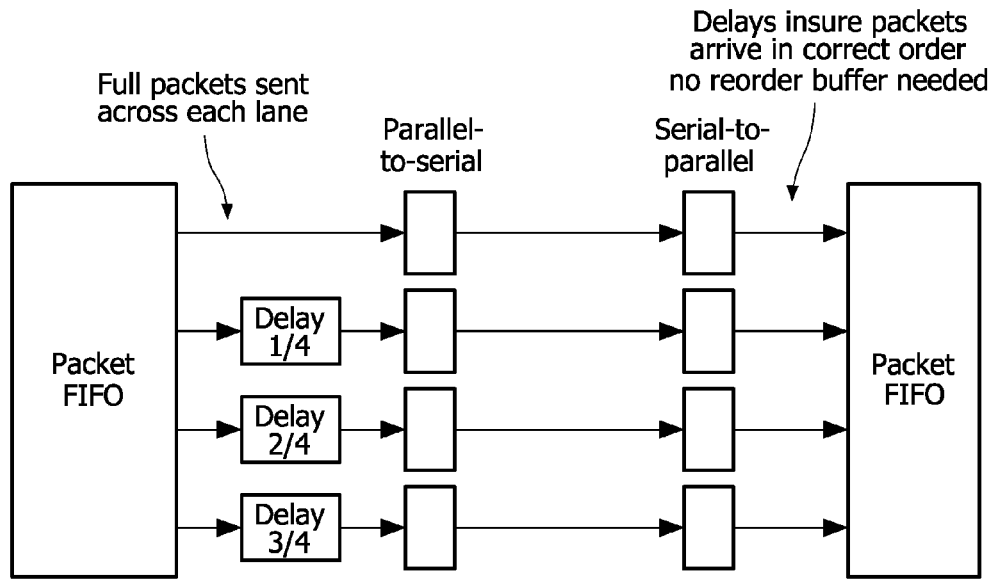
FIG. 2  INVENTION

ALIGNMENT AND DESKEW FOR MULTIPLE LANES OF SERIAL INTERCONNECT

The present invention relates generally to high speed data communication, and more particularly relates to reducing the complexity of circuitry used to receive, deserialize, and align, multiple streams of high speed serial data.

Advances in semiconductor manufacturing technology have resulted in very highly integrated circuits, which contain millions of transistors, along with various other components and interconnections. The integrated circuits that result from the aforementioned advances provide significant electronic functionality at relatively low costs. Such advances have been incorporated into both digital and analog integrated circuits, and these advances have resulted in a wide variety of consumer electronic products, including products in which high speed communication, or transfer, of data between various integrated circuits or modules is required.

Conventionally, requirements for increased data transfer rates were satisfied by means such as increasing the number of parallel data communication paths. That is, wider busses were conventionally used to meet the requirements for increased data transfer rates. However, there are several disadvantages with such an approach. For example, wide parallel busses consume more board space and therefore lead to increased costs. Additionally, wide parallel busses typically require higher pin counts on the chips, or integrated circuits, that interface with those wide parallel busses which in turn consumes more chip area and requires larger packages, both of which result in higher costs.

Another approach to dealing with increased data transfer rates is to provide fewer signal paths, wherein those signal paths are used to transfer data at higher speeds. Typically such arrangements provide for parallel-to-serial conversion on the transmitter side, and serial-to-parallel conversion on the receiver side.

Many contemporary architectures provide high speed serial pathways for data communications between integrated circuits and/or modules, in place of wide parallel busses. Such architectures provide advantages including, but not necessarily limited to, reduced pin counts, and reduced board space requirements.

In some instances, a plurality of high speed serial data paths are provided in order to increase the effective data transfer rate. Unfortunately, conventional systems that incorporate multiple high speed serial data paths, are subject to skewing problems and must provide additional circuitry, such as buffers and control logic to properly deskew and realign the data.

What is needed are methods and apparatus for providing high speed serial data communication between integrated circuits and/or modules, in which the requirements for buffers and control logic used in deskewing and/or realignment operations are reduced or eliminated.

In accordance with the present invention methods and apparatus are provided for data communication between a transmitter and receiver over a plurality of serial links, or lanes, which cause the transmitter to send serialized groups of bits down each of the plurality of serial links, in such a way that the first bit of each group is guaranteed to arrive in the correct order at the receiving end.

Various embodiments of the present invention include declaring a budget for the maximum skew between lanes. In such embodiments, subsequent to determining the skew budget between lanes, the data to be transmitted is divided into groups of N bits, where N is any convenient number larger than M times S, with M being the number of lanes and S being the budgeted skew, in bit times.

Further features and advantages will now be described, by way of example only, with reference to the accompanying drawings in which:

FIG. 1 is a schematic block diagram of a conventional system including multiple serial links between a data transmitter and a data receiver, and further showing a byte reorder buffer used to support deskewing and realignment operations.

FIG. 2 is a schematic block diagram of a system in accordance with the present invention in which predetermined delays are introduced at the transmitter side of the serial links such that the data realignment operations on the receiver side are obviated.

Figure 3:
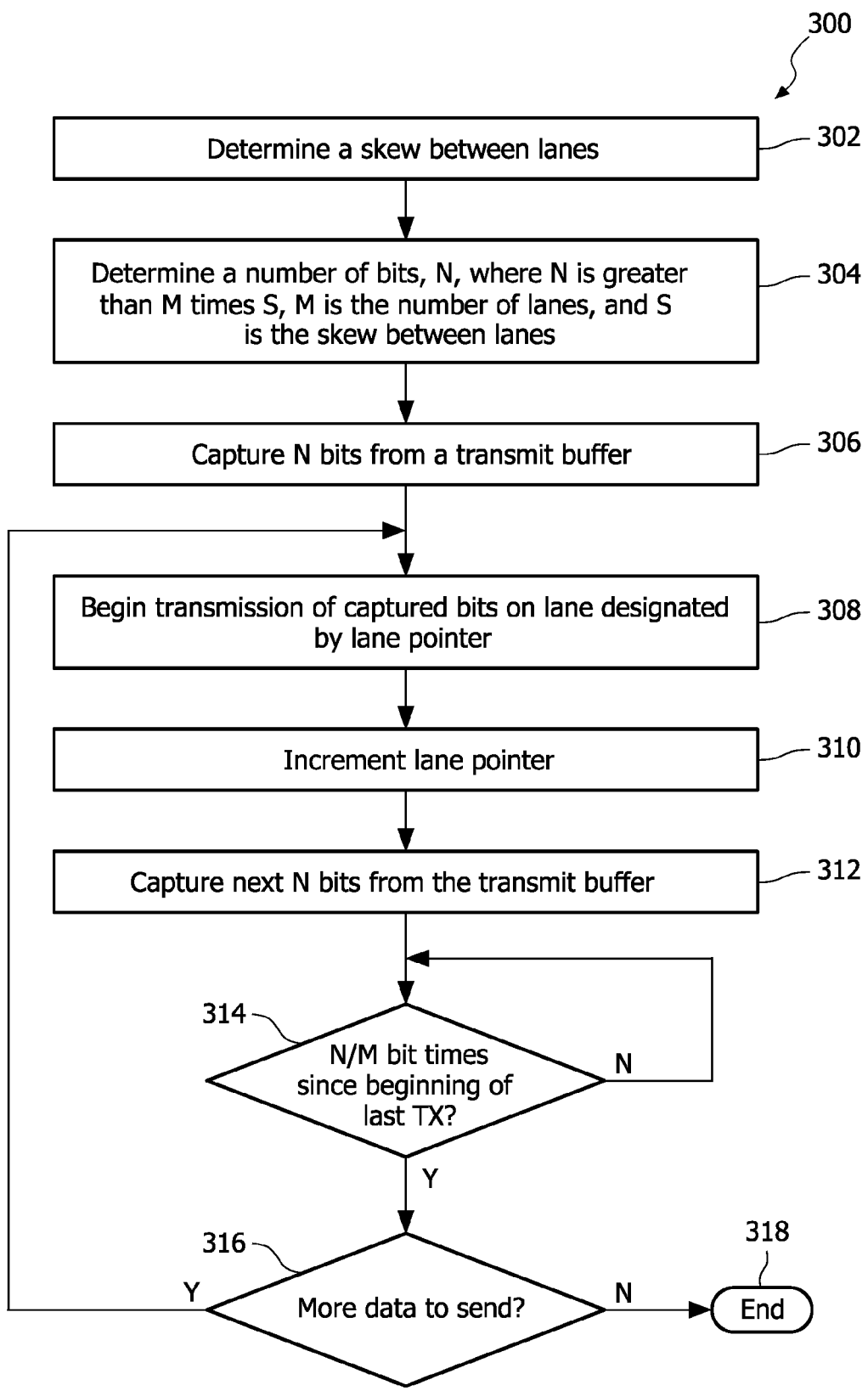
FIG. 3 is a flow diagram illustrating a method in accordance with the present invention.

Generally, the present invention relates to providing methods and apparatus for reducing or eliminating the overhead of deskewing and realignment found in conventional data receivers. More particularly, by introducing predetermined amounts of delay into the transmissions on various ones of a plurality of serial links (also known as lanes), the data arriving at the receiver is known to be in order and therefore byte order realignment is not required.

Reference herein to "one embodiment", "an embodiment", or similar formulations, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

The terms integrated circuit (IC), semiconductor device, monolithic device, microelectronic device, and chip are often used interchangeably in the field of electronics generally. The present invention is applicable to all the above as they are generally understood in the field.

When a serial link is used for data communication, the data, which is typically parallel, is converted to a serial bit stream and then transmitted over the serial link. At the receiving end, the serial bit stream is converted back to parallel data so that it may be used in parallel. It will be appreciated that the bandwidth of the interconnect is limited by the bit rate of the serial bit stream.

One method used to increase the bandwidth provided by the aforementioned serial link, is to provide multiple serial lanes. For the transmitter, this simply requires sending two, three, four, or possibly more bits at a time. For example, if there are two lanes, then two bits can be sent at once. For each subsequent bit period, two more bits are sent. If the bits are numbered 0, 1, 2, 3, 4, 5, 6, 7 . . . , then bits 0 and 1 are sent together in the first bit time, bits 2 and 3 are sent together in the second bit time, and so on. The number of serial bits sent at one time is commonly called the number of lanes. Consider a four-lane road, which can carry twice as many cars (serial bits) as a two-lane road.

If the interconnect is synchronous (i.e., timing of the data is related to some synchronizing event, such as a clock edge), then the bits can be expected to arrive at the receiver at substantially the same time, that is at the same synchronizing event. However, a fully synchronous serial link is significantly restricted in frequency, which in turn restricts bandwidth. To operate at higher frequencies, the circuitry used to drive the serial lines is likely to implement embedded synchronization techniques, where the serial data is encoded in such a way that it is possible for the receiver to recover a "clock" from the serial data. In this scenario, that is where a clock is recovered from the serial data stream, it is likely that skew develops between the lanes. Using the example above, bit 1 might arrive before bit 0. Alternatively, bit 0 may arrive together with bit 3; then bit 2 arrives together with bit 5, an so on. At very high frequencies, there could actually be multiple bit times of skew between the lanes. To recover the original bit stream, the receiver must be able to re-align the bits. This process may be referred to as de-skewing the bit streams.

A common approach to de-skewing the lanes is to use synchronization codes (sync codes) that are sent down each lane respectively. If the sync codes are sent down each lane at the same time, then the receiver can detect the delay between receiving the sync codes and use that information to know how to de-skew the received bit streams. One disadvantage with this approach is that the receiver does all of the difficult work. The transmitter does little to make deskewing simple for the receiver. This can be an issue if the receiver is implemented in an expensive manufacturing process, or one that is not well suited for digital logic (e.g., a DRAM process). It may also be the case that pushing all of the work to one end results in a more complicated design than that which could be achieved if the required work is split between the transmitter and the receiver.

Various embodiments of the present invention cause the initiator, that is, the transmitter, to send serialized groups of bits down each lane, in such a way that the first bit of each group (each lane) is guaranteed to arrive in the correct order at the receiving end.

Various embodiments of the present invention include declaring, or determining, a budget for the maximum skew between lanes. In such embodiments, subsequent to determining the skew budget between lanes, the data to be transmitted is divided into groups of N bits, where N is any convenient number larger than M times S, with M being the number of lanes and S being the budgeted skew, in bit times.

For example, with 2 lanes, and a skew budget of 5 bit times, N must be greater than 10. In this example 16 (two bytes) would be a good choice. With 4 lanes and 5 bit times, N must be greater than 4*5=20, so perhaps 24 bits (three bytes) would be a convenient choice.

The transmitter then captures the first N bits of the data to be transmitted, and begins transmitting those bits on lane 0. The next N bits will be transmitted on lane 1, but not until after N/M bit times have passed. This continues on each lane until bit groups have been started on all lanes. At approximately N/M bit times later (could be one more or one fewer, because N/M is generally rounded to an integer), the transmitter may send another group of N bits over lane 0.

Consider an illustrative example of the present invention with two lanes and a skew of 5 bits times (i.e., M*S=10). The number of bits might be chosen as N=16 (two bytes) for convenience. The bytes zero and one are captured are transmitted down lane 0. Subsequently, beginning at a point in time that is eight bit periods later (16/2=8), bytes two and three begin transmitting over lane 1. Eight bit times later (i.e., a total of 16 bit times from the beginning), bytes four and five begin transmitting over lane 0. In this example, at the receive end, the bits on lane 1 may arrive 8 bit times after the bits on lane 0. However, because of the 5-bit time skew budget, lane 1 bits may arrive as few as 3 bit times after lane 0 or as many as 13 bit times after lane 0. In any case, the first group of N bits sent over lane 1 always arrives after the first group of N bits on lane 0 and before the second group of N bits on lane 0. This makes it very easy for the receiver to deskew the groups because the order of arrival is guaranteed.

Consider a more complex illustrative example with 2 lanes and a skew budget of 9 bits. Here assume that N=24 is selected (must be greater than 2*9=18). The first group of 24 bits starts on lane zero at time 0. The second group of 24 bits starts on lane 1 twelve bit times later (24/2=12). At the receiving end, lane 1 data may arrive as early as three bits times later (12−9) or as late as 21 bit times later (12+9), but it will still always be between the first and second groups transmitted over lane 0.

Referring to FIG. 3, an illustrative process 300, in accordance with the present invention is described. In a first operation, a determination is made 302 as to the skew between lanes. This determination can be made in any suitable manner, for example the transmitter may reference a table that is dynamically updated. Such a table may be disposed within the transmitter integrated circuit or it may be external thereto. Alternatively, the skew between lanes may have been characterized for a particular design and the skews are pre-programmed into the transmitter device at the factory. A determination is made 304 as to the number of bits, N, that will be taken in groups for transmission. As noted above, N is greater than M times S, where M is the number of lanes, and S is the skew in bit times. N bits are then captured 306 from a memory, Such a memory may be referred to as transmit buffer, or a packet FIFO. Any suitable storage elements may be used to contain the data to be transmitted. A transmission 308 of the captured data is then begun, in which the data is sent on a designated one of the plurality of lanes. Any suitable means may be used for indicating the appropriate lane upon which to transmit. In one embodiment a pointer is used to indicate the lane, and this pointer is then incremented 310, or otherwise updated, so that it point to the next lane upon which data will be transmitted. The next N bits of transmit data are then captured 312. A determination 314 is made regarding whether N/M bit times have elapsed since the last transmission began. If the determination of 314 is negative, the process 300 waits for the determination to become affirmative. When the determination of 314 is affirmative, a determination 316 is made regarding whether more data is to be sent. If there is no more data to send, then process 300 ends at 318. However, if there is more data to send, control passes to step 308, and process 300 loops until the appropriate amount of data has been transmitted.

Embodiments of the present invention can be applied to serial data transmission systems where the allowed complexity of the receiver is limited. The simplification of delaying the transmission of bits over subsequent lanes shifts some of the complexity from the receiver to the transmitter, making the receiver's task much easier without significantly increasing the complexity of the transmitter.

It is to be understood that the present invention is not limited to the embodiments described above, but encompasses any and all embodiments within the scope of the subjoined Claims and their equivalents.

The invention claimed is:

1. A method of transmitting data between a transmitter having data to send, and a receiver, comprising:
   determining a skew budget between a plurality of serial links disposed between the transmitter and receiver;
   determining a number of bits N, where N is an integer greater than M×S, where M is the number of serial links, and S is the skew budget in bit times;
   capturing, in a circuit and in response to determining N, a first N bits of the data to be sent;
   beginning the transmission of the first N bits on a first one of the plurality of serial links;
   capturing, in a circuit and in response to determining N, a second N bits of the data; and transmitting the second N bits of data at approximately N/M bit times subsequent to the beginning of the transmission on the first one of the plurality of serial links, and beginning the transmission of the second N bits on a second one of the plurality of serial links.

2. The method of claim 1, wherein capturing the first N bits comprises accessing a memory disposed within the transmitter and serializing the first N bits.

3. The method of claim 2, wherein capturing the second N bits comprises accessing the memory disposed within the transmitter and serializing the second N bits.

4. The method of claim 1, further comprising the first N bits and the second N bits at the receiver.

5. The method of claim 1, further comprising capturing and transmitting additional groups of N bits on sequentially designated lanes, the beginnings of the transmissions being separated by N/M bit times, until all the data to be sent has been transmitted.

6. The method of claim 1, further including the step of determining a value for M×S and wherein the step of determining a number of bits N is in response to the value for M×S.

7. The method of claim 6, wherein the step of determining the number of bits N includes selecting an integer value that is both a multiple of 8 and that is greater than the determined value of M×S.

8. The method of claim 6, wherein determining N includes dividing the data to be transmitted into groups of N bits.

9. The method of claim 6, wherein the skew budget S is determined by reference to a dynamically updatable table.

10. The method of claim 6, further including the steps of
accessing a preprogrammed value representing the skew budget between the serial links, and
using the preprogrammed value as the skew budget S.

11. The method of claim 6, further including the step of delaying the sending the second N bits of data until after a period of at least N/M bit times have elapsed subsequent to sending the first N bits of data.

12. A transmitter adapted for use with a plurality of serial links, comprising:
a packet memory operable to store packets for transmission, the packet memory producing a multi-bit output when accessed; and
a data processing circuit configured for
determining a skew budget the plurality of serial links;
determining a number of bits N, where N is greater than M×S, where M is the number of serial links, and S is the skew budget in bit times;
capturing a first N bits of the data to be sent, and beginning the transmission of the first N bits on a first one of the plurality of serial links; and
capturing a second N bits of the data to be sent, at approximately N/M bit times subsequent to the beginning of the transmission on the first one of the plurality of serial links, and beginning the transmission of the second N bits on a second one of the plurality of serial links.

13. The transmitter of claim 12, wherein the data processing circuit is further configured for accessing the packet memory and serializing the first N bits.

14. The transmitter of claim 13, wherein the data processing circuit is further configured for accessing the packet memory and serializing the second N bits.

15. A method of transmitting data between a transmitter and a receiver over a plurality of serial links, comprising:
a) determining a skew between the serial links, the serial links between the transmitter and the receiver;
b) determining a number, N, where N is greater than M times S, M is the number of serial links, and S the skew;
c) capturing, in a circuit, N bits from a transmit buffer;
d) begin transmitting the captured N bits on a serial link designated by a serial link pointer;
e) updating the serial link pointer;
f) capturing a next N bits from the transmit buffer;
g) determining whether N/M bit times have elapsed since the beginning of the last transmission;
h) determining whether there is more data to be sent;
i) repeating steps (d) through (h).

16. The method of claim 15, wherein determining a skew between links comprises referring to a table.

17. The method of claim 16, wherein the table is disposed external to an integrated circuit on which the transmitter is disposed.

18. The method of claim 15, wherein capturing N bits comprises reading from a memory and serializing the data.

19. The method of claim 15, wherein updating the serial link pointer comprises incrementing a counter.

20. The method of claim 15, wherein N is a multiple of 8.

* * * * *